Oct. 7, 1930.  E. H. EWERTZ ET AL  1,777,879
DECK HOUSE FOR VESSELS
Filed Nov. 20, 1928  2 Sheets-Sheet 1
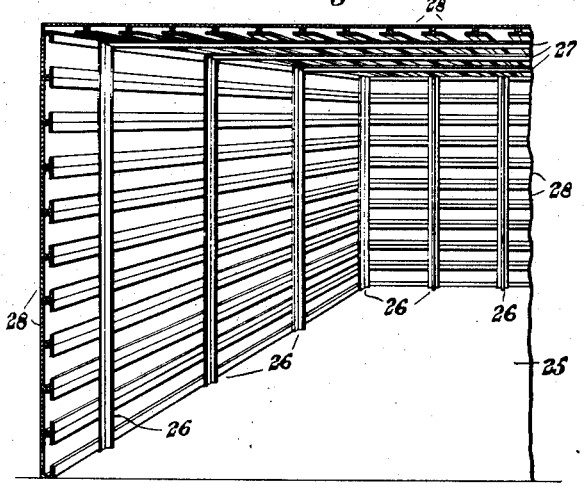
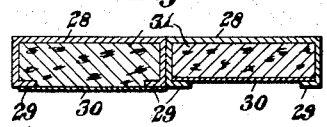
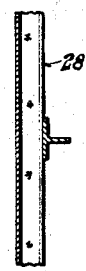
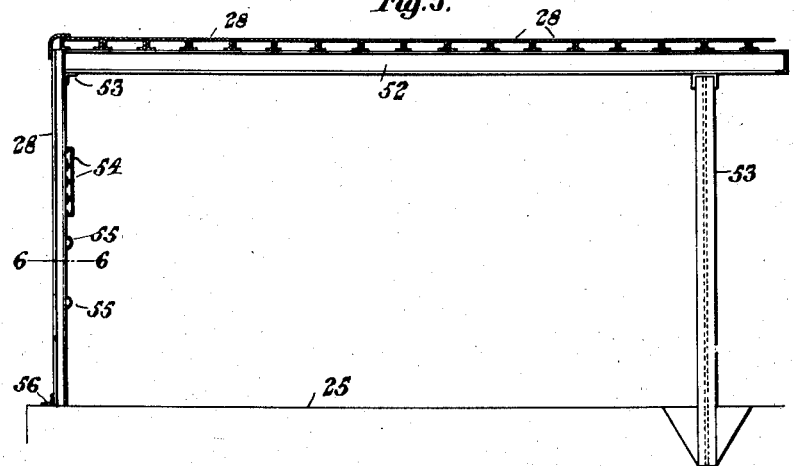
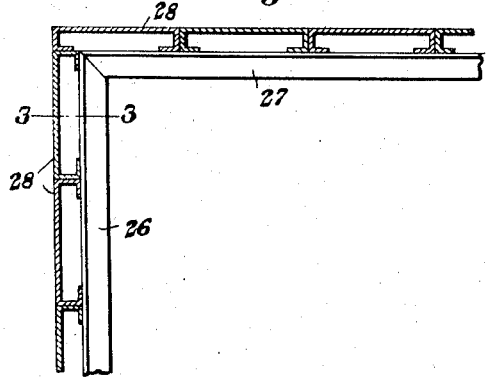
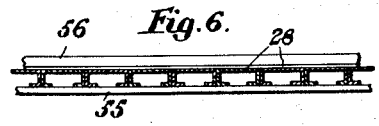
Inventors:
Eric H. Ewertz,
John T. Dalcher,
by Walter E. Lombard.
Atty.

Oct. 7, 1930.  E. H. EWERTZ ET AL  1,777,879
DECK HOUSE FOR VESSELS
Filed Nov. 20, 1928  2 Sheets-Sheet 2
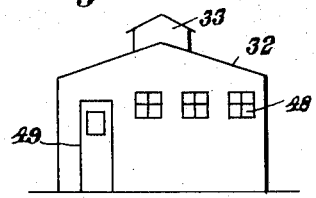
Fig. 7.
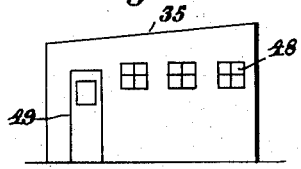
Fig. 8.
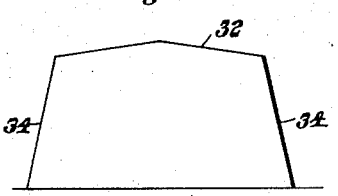
Fig. 9.
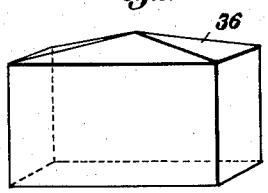
Fig. 10.
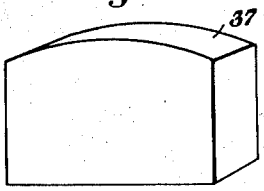
Fig. 11.
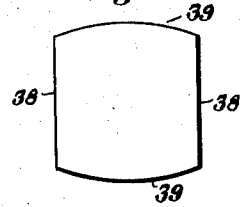
Fig. 12.
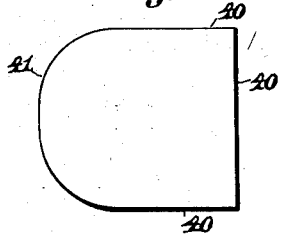
Fig. 13.
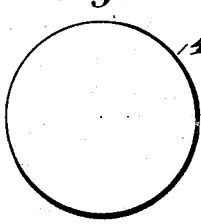
Fig. 14.
Fig. 15.
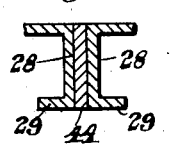
Fig. 20.
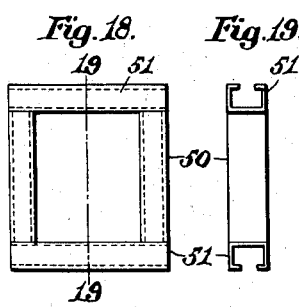
Fig. 18. Fig. 19.
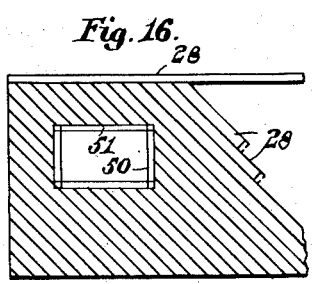
Fig. 16.
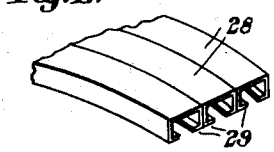
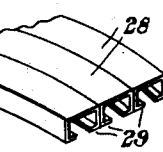
Fig. 17.
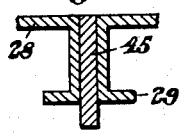
Fig. 21.
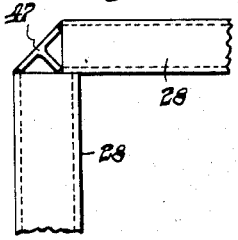
Fig. 24.
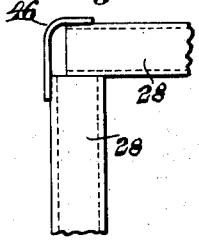
Fig. 23.
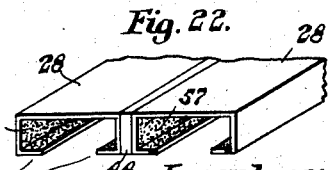
Fig. 22.
Inventors:
Eric H. Ewertz,
John T. Dalcher,
by Walter E. Lombard, Atty.

Patented Oct. 7, 1930

1,777,879

UNITED STATES PATENT OFFICE

ERIC H. EWERTZ, OF ELIZABETH, AND JOHN T. DALCHER, OF BAYONNE, NEW JERSEY

DECK HOUSE FOR VESSELS

Application filed November 20, 1928. Serial No. 320,687.

This invention relates to deck houses for vessels of all types and has for its object the construction of such deck houses from a plurality of units each unit having as its base a light channel section of steel known as "metal lumber."

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings

Figure 1 represents a perspective showing the construction of one form of deck house built up of channel sections and embodying the principles of the present invention.

Figure 2 represents an enlarged detail of one corner of the same.

Figure 3 represents a transverse section of the same on line 3, 3, on Fig. 2.

Figure 4 represents a section showing two channel sections united together and filled with cork.

Figure 5 represents a modified construction of deck house.

Figure 6 represents a section of the same on line 6, 6, on Fig. 5.

Figure 7 represents in diagram one form of deck house showing windows and door and having superimposed thereon a ventilator.

Figure 8 represents another form of deck house showing an inclined roof.

Figure 9 represents another form of deck house having a pitched roof and inclined side walls.

Figure 10 represents a still different form of deck house having the roof thereof extending to an apex.

Figure 11 represents still another form of deck house with curved roof.

Figure 12 represents in diagram a plan of deck house having two curved sides and two flat sides.

Figure 13 represents in diagram a plan of another form of deck house having three flat sides and one curved side.

Figure 14 represents in diagram a plan of a round deck house.

Figure 15 represents in diagram a plan of an oval deck house.

Figure 16 represents an elevation of a deck house having its side walls built up of inclined channel sections.

Figure 17 represents a perspective of a portion of the roof of a deck house, the channel sections of which are curved and united together.

Figure 18 represents an elevation showing the construction of one of the window frames of the deck house.

Figure 19 represents a section of the same upon line 19, 19, on Fig. 18.

Figure 20 represents a section showing a reenforcing plate interposed between and secured to two channel sections.

Figure 21 represents a similar section showing the stiffening plate extending beyond the inner faces of the channel sections.

Figure 22 represents a perspective of two channel sections with a stiffening plate interposed between said sections and secured thereto.

Figure 23 represents an elevation showing one means of connecting the roof to the vertical walls of a deck house, and Figure 24 represents another means of securing the roof to the deck house.

Similar characters indicate like parts throughout the several figures of the drawings.

In the drawings, 25 is the deck of a vessel having uprights 26 secured thereto, the upper ends of these uprights having horizontal T-bars 27 secured thereto.

Superimposed upon the T-bars 27 are a plurality of metal channel sections 28 known in the trade as "metal lumber".

The side walls of these metal channel sections are secured together in some well known manner as by riveting, bolting, welding or spot welding, making the joints between the various sections absolutely tight.

Secured to the outer faces of the uprights 26 and welded or otherwise secured thereto are a plurality of similar channel sections 28, these channel sections having the adjacent side walls thereof secured together as above described.

Each channel section 28 is provided with inwardly extending flanges 29 to which is welded or otherwise secured a stiffening plate 30.

This stiffening plate may be secured to the outer face of the flanges 29 as indicated at the left of Fig. 4 or may be secured to the inner face of said flanges, as indicated at the right of Fig. 4.

The interior of each channel section is preferably filled with cork 31 or some similar insulating material.

By providing this filling 31 of cork the metal sections will not sweat due to temperature changes.

In Fig. 1 of the drawings the metal channel sections are shown as horizontal but if desired these channel sections 28 may be inclined as indicated in Fig. 16 of the drawings.

Various forms of deck houses may be built up from these channel sections, as for instance, a deck house such as is shown in Fig. 7 with a pitch roof 32 and this deck house may be provided if desired with a ventilator 33 welded or otherwise secured to the roof of the house.

The deck house may be formed, if desired, with a pitch roof 32 as indicated in Fig. 9 with the side walls inclined as indicated at 34.

In some cases the deck house may be provided with a flat inclined roof 35, as shown in Fig. 8.

The roofs of the deck houses may be otherwise constructed as shown in Figs. 10 and 11, Fig. 10 showing a form in which the roof 36 is inclined to an apex, and Fig. 11 showing a form in which the roof 37 is curved.

In building up the deck houses from metal channel members they may be made with two side walls 38 and two curved walls 39, as indicated in Fig. 12, or they may be made with three straight side walls 40 and one curved wall 41 as shown in Fig. 13.

When necessary the deck house may be formed with its side walls circular as indicated at 42 in Fig. 14, or the side walls may be formed in the shape of an oval, as indicated at 43 in Fig. 15.

Where the roof 37 is curved as indicated in Fig. 11 the various channel sections 28 are placed side by side and united together by welding or otherwise, as indicated in Fig. 17.

The channel sections 28 whether used for the roof or for a side wall may be separated slightly and have a steel plate 44 interposed between the adjacent sections and welded or otherwise secured together as indicated in Figs. 20 and 22 of the drawings.

When extra stiffness is required a steel plate 45 may be interposed between the adjacent channel sections 28 and secured thereto, this plate having a greater width than the thickness of the channel sections so that a portion thereof will project inwardly beyond the flanges 29 as indicated in Fig. 1 of the drawings.

The ends of the channel sections 28 forming the roof of the deck house rest upon the upper ends of the channel sections 28 forming the side walls and have a curved plate 46 welded to both the roof sections and side wall sections as indicated in Fig. 23 of the drawings.

In Fig. 24 is shown a modified form of connecting the side wall sections to the roof sections by means of a T-bar 47, the ends of the flanges thereof being welded or otherwise secured to the upper ends of the side wall channel sections 28 and the ends of the channel sections 28 forming the roof.

The deck houses are preferably provided with windows 48 and doors 49.

In Figs. 18 and 19 is shown one construction of window frame consisting of the parallel upright channel sections 50 and horizontal sections 51 which are welded or otherwise secured to the opposite ends of the uprights 50.

When a window frame is thus formed it is inserted into an opening in the side walls of the deck house and welded or otherwise secured thereto.

A door frame may be similarly constructed.

While in Fig. 1 the channel sections 28 are shown horizontally, these channel sections may be placed vertically as indicated in Fig. 5 of the drawings, the metal channel sections 28 forming the roof resting upon an I-beam 52 supported at opposite ends on angle bars 53 welded or otherwise secured to the wall channel sections 28 and resting at an intermediate point upon an I-beam 53.

Where the metal channel sections 28 are placed vertically in the formation of the deck house, they may be sheathed on the inside of the deck house by means of horizontally disposed channel sections, as indicated at 54 in Fig. 5 of the drawings.

Where it is unnecessary to sheath the inner wall of the deck house these vertical channel sections 28 forming the side walls of the deck house may be stiffened by split pipes 55 extending transversely thereof and welded thereto.

The lower ends of the vertical channel sections forming the side walls of the house are secured to the deck 25 by means of angle bars 56, as indicated in Fig. 5.

The channel sections known as "metal lumber" come in various widths and lengths and may be united together in such a manner as to suit the particular dimensions of any form of deck house desired.

These channel sections are of steel and quite light.

When united to form a deck house they have many advantages over the usual wooden deck houses, being of light weight with considerable strength and rigidity, are fireproof, and are particularly adapted to have insulating material applied thereto when these houses either are to be heated or used for refrigeration purposes.

While many forms of deck houses have been illustrated and described herein it must be clearly understood that the invention is not confined to these particular types of deck houses as innumerable designs may develop by the use of the metal lumber sections.

When the channel sections are arranged with the closed faces on the outside they will present a smooth flat continuous surface on the outside of the deck house and when continuous welding is used between the adjacent sections, the side and top of the houses will be made absolutely waterproof.

These deck houses can be made waterproof even when the channel sections are riveted or bolted together by caulking all of the outside seams.

The inside of the house walls and also the roof may be stiffened by the use of angle, T, channel, or I-bars, all of which may be welded or otherwise secured to the flanges of the metal channel sections.

The size and type of these wall and roof stiffeners will depend entirely on the size of the deck house, the spacing apart of the stiffeners, and the load to be sustained by any particular part of the house.

Where it is found undesirable to fill the entire channel section with cork or other insulating material, the interior face of the channel sections may be painted and ground cork applied thereto before the paint has dried, as indicated at 57 in Fig. 22.

This layer of ground cork 57 will serve to prevent the channel section from sweating due to varying changes in temperature.

It is believed that the invention will be thoroughly understood from the foregoing without further description.

Having thus described our invention, we claim:

1. A deck house built up of a plurality of metal uprights and a plurality of relatively narrow metal channel sections extending transversely of and having L-shaped flanges secured to said uprights, said sections being parallel and in contact.

2. A deck house built up of a plurality of metal uprights; a plurality of relatively narrow parallel metal channel sections extending transversely of and having L-shaped flanges secured to said uprights with their edges in contact; and a plurality of relatively narrow metal channel sections positioned above said uprights and secured together to form the roof of said house.

3. A deck house built up of a plurality of metal uprights; and a plurality of elongated relatively narrow metal channel sections extending transversely of and having L-shaped flanges secured to said uprights with their edges secured together, said sections being parallel and partly curved in plan.

4. A deck house built up of a plurality of metal uprights; a plurality of parallel relatively narrow metal channel sections secured together and to said uprights, said sections extending transversely of said uprights; and a reenforcing steel plate within and between the side walls of each channel section.

5. A deck house built up of a plurality of metal uprights; a plurality of elongated parallel relatively narrow metal channel sections having L-shaped flanges secured together and to said uprights, said sections extending transversely of said uprights; and reenforcing steel plates secured to the flanges of said channel sections.

6. A deck house built up of a plurality of metal uprights; a plurality of elongated parallel relatively narrow metal channel sections having L-shaped flanges secured together and to said uprights, said sections extending transversely of said uprights; and a cork filling within each channel section.

7. A deck house built up of a plurality of metal uprights; a plurality of elongated parallel relatively narrow metal channel sections having L-shaped flanges secured together and to said upright, said sections extending transversely of said uprights; and reenforcing plates interposed between adjacent channel sections and secured thereto.

8. A deck house built up of a plurality of metal uprights; a plurality of elongated parallel relatively narrow metal channel sections having L-shaped flanges secured together and to said uprights, said sections extending transversely of said uprights; and a non-sweating material within the interior of each channel section.

9. A deck house built up of a plurality of metal uprights; a plurality of elongated parallel metal channel sections having L-shaped flanges secured together and to said uprights, said sections extending transversely of said uprights; and a sheathing secured to the inner faces of said channel sections.

10. A deck house built up of a plurality of metal uprights; a plurality of elongated parallel metal channel sections having L-shaped flanges secured together and to said uprights, said sections extending transversely of said uprights; and strengthening members extending transversely of the inner faces of said sections and welded thereto.

11. A deck house built up of a plurality of metal uprights; a plurality of elongated parallel metal channel sections extending transversely of said upright and forming the side walls; other elongated parallel metal channel sections forming a roof; and members welded at one edge to the upper ends of the wall sections and at the opposite edge to the outer ends of the roof sections.

12. A deck house built up of a plurality of metal uprights T-shaped in cross section and a plurality of thin, relatively narrow metal channel sections extending transversely of and secured to said uprights, said sections being parallel and in contact and having on their inner faces flanges extending towards each other.

13. A deck house built up of a plurality of metal uprights T-shaped in cross section; a plurality of parallel thin, relatively narrow metal channel sections extending transversely of and secured to said uprights with their edges in contact; T-bars secured to the upper ends of said uprights; and a plurality of metal channel sections secured to said T-bars and forming the roof of said house.

14. A deck house built up of a plurality of metal uprights; and a plurality of parallel relatively narrow thin metal channel sections extending transversely of and secured to said uprights with their edges secured together, said channel sections having at their open sides, flanges extending toward each other.

15. A deck house built up of a plurality of metal uprights; a plurality of elongated parallel relatively narrow metal channel sections secured together and to said uprights, said sections extending transversely of said uprights and each channel section having on its open side, flanges extending toward each other; and a cork filling within each channel section between said flanges and the rear wall thereof.

16. A deck house built up of a plurality of metal uprights; a plurality of elongated relatively narrow thin metal channel sections secured together and to said uprights, each channel section having on its open side, flanges extending toward each other; and reenforcing plates interposed between and secured to adjacent channel sections and extending beyond the outer faces of said flanges.

17. A deck house built up of a plurality of metal uprights; a plurality of elongated relatively narrow parallel metal channel sections secured together and to said uprights, said sections extending transversely of said uprights and forming the side walls of the house; and a sheathing of thin metal channel sections secured to the inner faces of said wall channel sections.

18. A deck house built up of a plurality of metal uprights; a plurality of elongated relatively narrow thin metal channel sections extending transversely of and secured to said uprights and forming the side walls; other thin metal channel sections secured together and forming the roof; and L-shaped plates extending over and welded to the upper ends of the wall sections and the outer ends of the roof sections.

Signed by us at New York city, N. Y., this 10th day of November, 1928.

ERIC H. EWERTZ.
JOHN T. DALCHER.